United States Patent [19]

Amick et al.

[11] Patent Number: 4,711,725

[45] Date of Patent: Dec. 8, 1987

[54] METHOD OF STABILIZING AQUEOUS SYSTEMS

[75] Inventors: David R. Amick, Chalfont; William M. Hann, Pennsburg; John Natoli, Ambler, all of Pa.

[73] Assignee: Rohm and Haas Co., Philadelphia, Pa.

[21] Appl. No.: 861,732

[22] Filed: May 7, 1986

Related U.S. Application Data

[63] Continuation-in-part of Ser. No. 749,059, Jun. 26, 1985, abandoned.

[51] Int. Cl.$^4$ ............................................. C02F 5/12
[52] U.S. Cl. ................................... 210/701; 252/180
[58] Field of Search .............................. 210/698–701; 252/180, 181; 422/15, 17

[56] References Cited

U.S. PATENT DOCUMENTS

| | | | |
|---|---|---|---|
| 3,463,730 | 8/1969 | Booth et al. | 210/701 |
| 3,709,815 | 1/1973 | Boothe et al. | 210/701 |
| 3,806,367 | 4/1974 | Lange et al. | 210/701 |
| 3,928,196 | 12/1975 | Persinski et al. | 252/180 |
| 4,026,815 | 5/1977 | Kallfass et al. | 210/700 |
| 4,147,682 | 4/1979 | Yada et al. | 162/164.5 |
| 4,432,879 | 2/1984 | Greaves et al. | 210/699 |
| 4,432,884 | 2/1984 | Kawasaki et al. | 210/701 |
| 4,532,048 | 7/1985 | Amjad et al. | 252/180 |
| 4,552,665 | 11/1985 | Ralston et al. | 210/701 |
| 4,566,973 | 1/1986 | Masler et al. | 210/701 |

FOREIGN PATENT DOCUMENTS

| | | | |
|---|---|---|---|
| 76992 | 4/1983 | European Pat. Off. | |
| 10913003 | 4/1983 | European Pat. Off. | |
| WO83/02607 | 8/1983 | PCT Int'l Appl. | 210/701 |

*Primary Examiner*—Peter Hruskoci

[57] ABSTRACT

A process for stabilizing aqueous systems containing scale forming salts and inorganic particulates by adding to such systems an effective amount of selected low molecular weight water soluble polymers containing from about 10 to about 84 weight percent (meth)acrylic acid units, greater than 11 to less than about 40 weight percent acrylamido alkyl or aryl sulfonate units and from at least about 5 to about 50 weight percent of one or more units selected from vinyl esters, vinyl acetate and substituted acrylamides, is provided. The terpolymers and interpolymers used in the process provide improved phosphate, iron and zinc stabilization while maintaining their water solubility. Certain preferred polymers also exhibit a high degree of hydrolytic stability at high pH conditions.

9 Claims, No Drawings

METHOD OF STABILIZING AQUEOUS SYSTEMS

BACKGROUND OF THE INVENTION

1. Field of the Invention

This application is a continuation-in-part of application Ser. No. 749,059 filed June 26, 1985, now abandoned.

This invention relates to an improved process for stabilizing aqueous systems by the addition of small quantities of low molecular weight, water soluble polymers. More particularly the invention relates to the selection of at least three monomers which when polymerized together form terpolymers and interpolymers that exhibit unexpectedly improved precipitation inhibition and dispersion performance for phosphates, iron, zinc, and other inorganic particulates in aqueous systems, such as cooling towers.

The polymers that have been found to exhibit this improved performance in aqueous systems contain units derived from (meth)acrylic acid and salts thereof, acrylamido alkyl or aryl sulfonates and one or more units derived from vinyl esters, vinyl acetate and alkyl substituted acrylamides, in certain selected weight percentages.

2. Description of the Prior Art

Many industrial applications and residential areas utilize water containing relatively high concentrations of inorganic salts. These salts are formed by the reaction of metal cations, such as calcium, magnesium or barium, with inorganic anions such as phosphate, carbonate and sulfate. These salts have low solubilities in water and as their concentration in solution increases, or as the pH or temperature of the water containing them increases, these salts tend to precipitate from solution, crystallize and form hard deposits or scale on surfaces. Scale formation is a problem in heat transfer devices, boilers, secondary oil recovery wells and on clothes washed with such hard waters.

Many cooling water systems, including industrial cooling towers and heat exchangers, made from carbon steel experience corrosion problems caused by the presence of dissolved oxygen. Corrosion is combated by the addition of various inhibitors such as orthophosphate compounds and/or zinc compounds. The addition of phosphates, however, adds to the formation of highly insoluble phosphate salts such as calcium phosphate. The addition of zinc compounds can also lead to the precipitation of insoluble salts such as zinc hydroxide, and zinc phosphate. Other inorganic particulates, such as mud, silt and clay, are commonly found in cooling water. These particulates tend to settle onto surfaces and thereby restrict water flow and heat transfer unless they are effectively dispersed.

The stabilization of aqueous systems containing scale forming salts and inorganic particulates involves one or a combination of mechanisms. Anti-precipitation involves the delay of precipitation by limiting the size of the salts to sub-colloidal dimensions possibly by adsorption of the inhibitor onto the salt crystal soon after nucleation, thereby interfering with further crystal growth. Dispersion of the precipitated salt crystals is another stabilization mechanism believed to be the result of the adsorption of the inhibitor onto precipitated crystals, thereby imparting an electronegative charge which retards agglomeration, settling and deposition on surfaces by repulsive forces. The adsorption of the inhibitor can also be used to stabilize the system by facilitating the dispersion and subsequent removal of other suspended particulates, such as mud, silt and clay, and metals such as iron and zinc and their insoluble salts, from aqueous systems. Another stabilization mechanism involves the ability of the inhibitor to interfere with and distort the crystal structure of the scale making the scale more easily fracturable and dispersable.

Polymers derived from (meth)acrylic acids and salts as well as mixtures of such polymers with other compounds and polymers, such as phosphonic acids, have long been used as precipitation inhibitors for aqueous systems. Copolymers of (meth)acrylic acids and vinyl esters, such as hydroxy ethyl methacrylate and hydroxy propyl acrylate, and copolymers of (meth)acrylic acids and salts with acrylamido alkyl or aryl sulfonates or unsubstituted acrylamides have also been used for water treatment. Terpolymers formed from acrylic acid, 2-acrylamido-2-methyl propane sulfonic acid (AMPS) and unsubstituted acrylamide have also been proposed to remove rust and tubercles from surfaces.

For example, U.S. Pat. No. 3,578,589 is directed to the use of poly(meth)acrylic acids and copolymers for treating scale in aqueous systems. U.S. Pat. Nos. 3,332,904; 3,692,673; 3,709,815; 3,709,816; 3,928,196; 3,806,367 and 3,898,037 are directed to using AMPS-containing polymers. U.S. Pat. Nos. 3,699,048 and 3,890,228 are directed to the use of phosphonic acids mixed with poly(meth)acrylates for water treatment. U.S. Pat. No. 3,085,916 is directed to the use of polyacrylamides as dispersants. GB No. 2082600 is directed to an acrylic acid, AMPS, acrylamide polymer as a scale inhibitor, while WO No. 83/02607 and WO No. 83/02628 are directed to (meth)acrylic acid/AMPS copolymers for this application. U.S. Pat. Nos. 4,404,111 and 4,342,653 are directed to the use of AMPS copolymerized with acrylamides and optionally with acrylic acid. Other publications of interest include U.S. Pat. Nos. 3,110,666, 4,457,847; 4,029,577; 4,209,398; EPC Nos. 0,108,842; 4,029,577, 4,209,398, 4,432,884, 4,309,523 and 4,432,879.

In addition, our issued U.S. Pat. Nos. 4,517,098 and 4,530,766 and the references cited therein disclose the use of low molecular weight (meth)acrylic copolymers for use in scale inhibition and dispersion of inorganic particulates in water.

Despite the large number of publications in this area disclosing scale inhibition, dispersion and/or stabilization of aqueous systems utilizing polymers derived from (meth)acrylic acid, AMPS and ethylenically unsaturated monomers, no one conventional material or combination has been found to be completely effective at low use levels, regardless of the pH and temperature of the aqueous system, for stabilizing aqueous sytems containing all the various types of scale forming salts and suspended inorganic particulates commonly found in cooling tower waters. No one had, heretofore, discovered that if certain known materials, used for these applications, were polymerized together in certain selected weight ratios to form a low molecular weight, water soluble terpolymer or interpolymer the best stabilization performance characteristics of each constituent could be achieved. As used herein the term "terpolymer" defines a polymer formed from three monomers and the term "interpolymer" defines a polymer formed from at least four monomers. The term "copolymer" as used herein refers to polymers formed from only two monomers.

It is, therefore, an object of the present invention to design terpolymers and interpolymers which provide improved phosphate stabilization in aqueous systems over conventional polymeric additives.

It is also an object of the invention to provide selected terpolymers for the stabilization of iron and zinc and salts thereof in aqueous systems.

It is a further object of the invention to select certain terpolymers and interpolymers to disperse inorganic particulates and concentrated aqueous slurries.

It is an additional object of the invention to design terpolymers and interpolymers possessing improved stabilization and dispersion performance while maintaining their water solubility and hydrolytic stability at high pH conditions.

SUMMARY OF THE INVENTION

We have unexpectedly found that aqueous systems can be effectively stabilized by the addition of low molecular weight, water soluble terpolymers and interpolymers containing from about 10 to about 84 percent by weight of units derived from (meth)acrylic acids and salts, from greater than 11 to less than about 40 percent by weight of units derived from acrylamido alkyl or aryl sulfonates, and from at least about 5 to about 50 percent by weight of one or more units selected from certain vinyl esters, vinyl acetate and substituted acrylamides. These terpolymers and interpolymers when added to aqueous systems exhibit unexpectedly improved phosphate stabilization and iron and zinc dispersion as compared with conventional additives while maintaining their water solubility. Certain preferred terpolymers and interpolymers also exhibit a high degree of hydrolytic stability at high pH conditions. Further, it has been found that copolymers formed from about 60 to about 90 weight percent (meth)acrylic acid and salts thereof and from about 40 to about 10 weight percent substituted acrylamides, having a weight average molecular weight of from about 2500 to about 8000, are unexpectedly useful as precipitation inhibitors for zinc and its salts in aqueous systems.

DETAILED DESCRIPTION OF THE INVENTION

We have found that terpolymers and interpolymers of selected, low molecular weights, formed from at least three selected monomers in selected weight ratios can be designed to incorporate the beneficial scale inhibition and dispersion (referred to herein jointly as "stabilization") characteristics of each of these known monomers and result in unexpectedly improved performance as stabilizers for aqueous systems as compared with the corresponding conventional homopolymers, copolymers and mixtures thereof.

The terpolymers and interpolymers found to be useful in the present invention contain units derived from at least three types of monomers: (1) (meth)acrylic acids and salts; (2) acrylamido alkyl or aryl sulfonates; and (3) at least one unit derived from certain vinyl esters, vinyl acetate and substituted acrylamides.

The weight percent of the units of the terpolymer or interpolymer which are derived from (meth)acrylic acids and salts thereof can vary from about 10 to about 84 percent, and preferably from at least about 30 percent. These (meth)acrylic acids and salts have the following structural formula (A):

where
$R_1$ is hydrogen or $CH_3$ and
X is hydrogen, a metal cation or $N-(R_2)_4$ where $R_2$ is hydrogen, a $C_1-C_4$ alkyl group, a $C_1-C_4$ hydroxyalkyl group, or mixtures thereof.

The preferred (meth)acrylic acids and salts include acrylic acid, methacrylic acid and sodium salts thereof. Other vinyl dicarboxylic acids and anhydrides thereof, such as for example maleic acid, fumaric acid, itaconic acid and their anhydrides, may also be used in place of all, or part of, the (meth)acrylic acid and salt component of the selected terpolymers and interpolymers for use in stabilizing aqueous systems.

The units of the terpolymer or interpolymer which are derived from acrylamido alkyl or aryl sulfonates must be greater than 11 percent and less than about 40 percent by weight. If the concentration of the acrylamido alkyl or aryl sulfonate units in the terpolymer or interpolymer is 11 weight percent or less, a significant drop-off in stabilization performance results, and if the concentration of this unit in the selected terpolymer or interpolymer is greater than about 40 percent, the economic viability of the selected terpolymer or interpolymer suffers. The acrylamido alkyl or aryl sulfonates useful in the terpolymer or interpolymer of the invention are represented by the following structural formula (B).

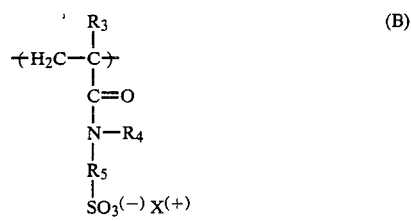

where
$R_3$ is hydrogen or methyl;
$R_4$ is hydrogen or $C_1-C_4$ alkyl group
$R_5$ is $C_1-C_8$ alkyl or $C_8-C_{10}$ aralkyl group; and where X is the same as defined in structural formula A.

The other unit(s) of the terpolymer or interpolymer is, or are, derived from one or more of the following: certain vinyl esters as defined by structural formula (C) below, vinyl acetate as defined by structural formula D below, or a substituted acrylamide as defined by structural formula E below. One or more of these units may be incorporated into the terpolymer or interpolymer respectively. The overall concentration of the third unit in the terpolymer or interpolymer ranges from at least about 5 weight percent to about 50 weight percent and preferably from about 5 to about 30 percent by weight.

The selected vinyl esters are represented by the following structural formula (C):

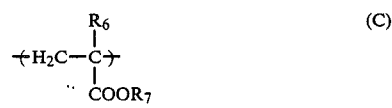

where
  $R_6$ is hydrogen or $CH_3$; and
  $R_7$ is a $C_1$–$C_6$ alkyl group, a $C_6$–$C_{10}$ aryl group, a $C_6$–$C_{10}$ aralkyl group or $$+CH_2-\underset{\underset{R_9}{|}}{\overset{\overset{R_8}{|}}{CH}}-O\!\!+_{\!\!n}R_9$$

where
  $R_8$ is hydrogen or $CH_3$;
  $R_9$ is a $C_1$–$C_6$ alkyl group or hydrogen; and
  n is an integer of from 1 to 3.

The vinyl esters represented by structural formula C are different from the (meth)acrylic acid salts represented by structural formula A.

The vinyl acetate unit may be represented by the following structural formula (D):

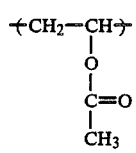   (D)

The substituted acrylamide unit may be represented by the following structural formula (E):

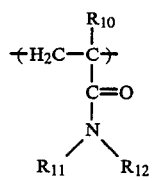   (E)

where
  $R_{10}$ is hydrogen or $CH_3$; and
  $R_{11}$ and $R_{12}$ are either hydrogen, a $C_1$–$C_8$ alkyl, a $C_6$–$C_8$ cycloalkyl, a benzyl group, or $$+CH_2-\underset{\underset{R_9}{|}}{\overset{\overset{R_8}{|}}{CH}}-O\!\!+_{\!\!n}R_9$$

as defined in structural formula C, such that $R_{11}$ and $R_{12}$ are not both hydrogen.

The (meth)acrylic acid or salt units are cost effective precipitation inhibitors or dispersants capable of low levels of performance when used by themselves. The acrylamido alkyl or aryl sulfonate units provide improved calcium tolerance and phosphate stabilization characteristics to the (meth)acrylic acid or salt component and improved stabilization when iron is present. When the third unit is a selected vinyl ester, substitued acrylamide or vinyl acetate, we have found that the stabilization efficiency of the acrylamido alkyl or aryl sulfonate component for phosphate, zinc and inorganic particulates is unexpectedly increased.

The water solubility of the selected terpolymer or interpolymer has also been found to be improved by the incorporation of the vinyl ester or acetate units with the acrylamido alkyl or aryl sulfonate component in the selected weight ratios. When the third unit is a substituted acrylamide, and not a vinyl ester or vinyl acetate, the hydrolytic stability of the resulting terpolymer has been found to be unexpectedly improved.

We have found that if more than one type of the same third monomer unit (i.e. two types of selected vinyl esters) is used to form an interpolymer, the stabilization performance characteristics is not significantly improved as compared to a selected terpolymer containing the same concentration of only one of such monomer units.

We have found that 2-acrylamido-2-methyl propane sulfonic acid (AMPS) is the preferred substituted acrylamido sulfonate, and that hindered amines such as t-butyl acrylamide, t-octyl acrylamide and dimethylacrylamide are the preferred (alkyl) substituted acrylamides. Preferred vinyl esters include ethyl acrylate, hydroxy ethyl methacrylate hydroxy propyl acrylate and cellosolve acrylate.

The terpolymers and interpolymers useful in the process of the invention, containing the selected units in the selected weight ratios, have weight average molecular weights ranging from about 3000 to about 25,000, and preferably from about 4000 to about 8000 weight average molecular weight.

The most preferred terpolymer of the invention contains about 57 percent by weight (meth)acrylic acid or salt units, 23 percent by weight AMPS and 20 percent by weight of a vinyl ester, vinyl acetate or alkyl substituted acrylamide, and a molecular weight ranging from about 4500 to about 5500 weight average molecular weight.

The following methods may be used for synthesizing the terpolymers and interpolymers useful in practicing the present invention.

TERPOLYMER AND INTERPOLYMER SYNTHESIS

In general, the prior art discloses several suitable synthesis methods for preparing low molecular weight copolymers of (meth)acrylic acid. These methods can be used to prepare the terpolymers and interpolymers useful in the present invention.

U.S. Pat. No. 4,314,004 is directed to one such suitable copolymer synthesis method and the disclosure thereof is incorporated herein by reference. This method requires a specific concentration range of a polymerization initiator and a specific molar ratio range of the initiator concentration and the concentration of certain metal salts to obtain the desired low molecular weight polymers useful in the present invention. The preferred polymerization initiators are peroxide compounds such as ammonium persulfate, potassium persulfate, hydrogen peroxide and t-butyl hydroperoxide. The preferred concentration range of the initiator is between about 1 to about 20 weight percent based on the weight of monomers. The metal salts used to regulate molecular weight preferably include cuprous and cupric chloride or bromide, cupric sulfate, cupric acetate, ferrous and ferric chloride, ferrous sulfate and ferric and ferrous phosphate. The molar ratio of the polymerization initiator to the metal salt is preferably between about 40:1 to about 80:1. The terpolymer and interpolymers of (meth)acrylic acid useful in this invention are preferably prepared in water at a polymer concentration of about 40 to about 50 percent based on total weight of solution.

Another method useful to prepare these low molecular weight terpolymers and interpolymers is described in U.S. Pat. No. 4,301,266, the disclosure thereof also being incorporated herein by reference. In this process isopropanol is used as the molecular weight regulator as well as the reaction solvent. The reaction solvent may also be an aqueous mixture of isopropanol containing at least 45 weight percent isopropanol. The polymerization initiator is a free radical initiator such as hydrogen peroxide, sodium persulfate, potassium persulfate, or benzoyl peroxide. The polymerization is carried out under pressure at a temperature of 120° to 200° C. The concentration of the copolymer in the solvent is preferably 25 to 45 percent based on the weight of the total solution. When polymerization is complete, the isopropanol is distilled from the reactor and the polymer may be neutralized with a base.

Still another method for preparing low molecular weight terpolymers and interpolymers useful in this invention is described in U.S. Pat. No. 3,646,099, the disclosure thereof also being incorporated herein by reference. This process is directed to the preparation of cyano-containing oligomers; however, it is also applicable for preparing low molecular weight polymers useful in the present invention. This process employs a bisulfite salt as the polymerization molecular weight regulator and the resulting polymers prepared thereby are sulfonate terminated. The preferred bisulfite salt is sodium bisulfite at a concentration of between 3 and 20 weight percent based on the weight of monomers. The free radical polymerization initiator is ammonium, sodium or potassium persulfate, hydrogen peroxide or t-butyl hydroperoxide. The concentration of the initiator is between about 0.2 to about 10 weight percent based on monomers. The polymerization temperature is preferably between 20° and 65° C. and the concentration of the polymers in the aqueous solvent is between 25 and 55 weight percent based on total solution weight.

TESTS PERFORMED

The following presents the tests performed using the terpolymers and interpolymers of the invention for stabilizing the precipitation of calcium phosphate in aqueous systems. Two different cooling waters were used: one having iron contamination and a low level of phosphate; the other without iron contamination but with a higher concentration of phosphate ions. The percent precipitation inhibition caused by the addition of the terpolymer, interpolymers or comparative conventional polymers was calculated using the formula:

$$\frac{T}{I} \times 100$$

where

T equals the parts per million (ppm) of phosphate ions remaining in solution at the conclusion of the test as analyzed using ascorbic acid method (APHA standard, 13th edition, page 532, 1971) and I equals the ppm phosphate in the aqueous solution at the beginning of the test.

The following general procedure was used for both tests:

Stock solutions containing calcium ions ($Ca^{+2}$) and optionally ferric ($Fe^{+3}$) ions depending on the test, are prepared from the chloride salts at twice the concentration needed in the final test solution.

A second set of stock solutions containing phosphate ions ($PO_4^{-3}$), using disodium phosphate, were prepared, also at twice the concentration needed in the final test solution.

Stock solutions containing 0.1 percent by weight of the active polymers, expressed as the acid form, were also prepared.

To a four ounce jar the following were added in this order:

1. 50 ml of the phosphate stock solution;
2. 1 ml, 1.5 ml or 2.0 ml of the polymer stock solution to yield 10 ppm, 15 ppm or 20 ppm active polymer, respectively; and
3. 50 ml of the calcium ion stock solution.

The pH of each of the resultant mixtures was adjusted to pH 8.5. The jars were then capped and placed in a water bath at 70° C. for 17 or 24 hours depending on the phosphate stock solution, as shown in Table 1. At the end of this period, the jars were removed from the bath, and the solutions were filtered using a 0.22 micron filter paper. The filtered solution was then analyzed for parts per million (ppm) phosphate using the ascorbic acid method. The reagent concentrations, polymer compositions, molecular weight and test results are illustrated in Table 1.

TABLE 1

Calcium Phosphate Precipitation Inhibition

| Sample | Polymer Composition Wt. % | $\overline{M_w}$ | Iron Contam. Water[1] | % Inhibition High Phosphate Water[2] | |
|---|---|---|---|---|---|
| | | | | 15 ppm Polymer | 20 ppm Polymer |
| Control 1 | None | — | 17 | — | — |
| Comparative 2 | AA/AMPS//83/17 | 4610 | 50 | — | 3 |
| 3 | AA/AMPS//77/23 | 4500 | 93 | — | 14 |
| 4 | AA/HEMA//75/25 | 2900 | 47 | — | — |
| 5 | AA/HPA//62/38 | 2960 | 34 | — | 21 |
| 6 | AA/EA//80/20 | 5300 | 49 | — | — |
| 7 | AA/t-BAM//80/20 | 3000 | 41 | 12 | — |
| 8 | AA/AMPS/AM//68/17/15 | 4520 | 80 | — | — |
| 9 | AA/AMPS/AM//58/17/25 | 4350 | 25 | — | — |
| 10 | AA/AMPS/AM//57/23/20 | 3750 | — | 21 | — |
| 11 | AA/AMPS/EA//72/23/5 | 5250 | 92 | — | 66 |
| 12 | AA/AMPS/EA//67/23/10 | 4840 | 89 | — | 89 |
| 13 | AA/AMPS/EA//57/23/20 | 4840 | — | 69 | 95 |
| 14 | AA/AMPS/tBA//67/23/10 | 5510 | — | 39 | — |
| 15 | AA/AMPS/VAC//57/23/20 | 10100 | 94 | — | 75 |
| 16 | AA/AMPS/HEMA//69/11/20 | 7690 | 48 | — | 19 |
| 17 | AA/AMPS/HEMA//63/17/20 | 6860 | 95 | — | 89 |
| 18 | AA/AMPS/HEMA//72/23/5 | 4360 | 96 | — | 78 |
| 19 | AA/AMPS/HEMA//67/23/10 | 4560 | — | — | 93 |
| 20 | AA/AMPS/HEMA//57/23/20 | 5430 | — | 79 | 96 |
| 21 | AA/AMPS/HEMA//42/23/30 | 5920 | — | — | 91 |
| 22 | AA/AMPS/HEMA//57/23/20 | 2430 | 32 | — | 90 |

TABLE 1-continued

Calcium Phosphate Precipitation Inhibition

| Sample | Polymer Composition Wt. % | $\overline{Mw}$ | Iron Contam. Water[1] | % Inhibition High Phosphate Water[2] | |
|---|---|---|---|---|---|
| | | | | 15 ppm Polymer | 20 ppm Polymer |
| 23 | AA/AMPS/HEMA//57/23/20 | 3180 | 53 | 89 | — |
| 24 | AA/AMPS/HEMA//57/23/20 | 4100 | 59 | 89 | — |
| 25 | AA/AMPS/HEMA//57/23/20 | 8070 | 91 | — | 92 |
| 26 | AA/AMPS/HEMA//57/23/20 | 14900 | 97 | — | 90 |
| 27 | AA/AMPS/HPA//63/17/20 | 5410 | 94 | — | 63 |
| 28 | AA/AMPS/HPA//72/23/5 | 4060 | — | — | 80 |
| 29 | AA/AMPS/HPA//67/23/10 | 4270 | — | — | 86 |
| 30 | AA/AMPS/HPA//57/23/20 | 5610 | 94 | — | 91 |
| 31 | AA/AMPS/HPA//57/23/20 | 3970 | — | — | 94 |
| 32 | AA/AMPS/HPA//47/23/30 | 4390 | — | — | 95 |
| 33 | AA/AMPS/DMAM//72/23/5 | 4660 | — | — | 70 |
| 34 | AA/AMPS/DMAM//67/23/10 | 4840 | — | — | 91 |
| 35 | AA/AMPS/DMAM//57/23/20 | 4050 | — | 76 | 98 |
| 36 | AA/AMPS/EAM//57/23/20 | 5690 | — | 91 | — |
| 37 | AA/AMPS/PrAM//57/23/20 | 4020 | — | 72 | — |
| 38 | AA/AMPS/tBAM//67/23/10 | 3980 | 99 | — | 92 |
| 39 | AA/AMPS/tBAM//57/23/20 | 4610 | 91 | 89 | 92 |
| 40 | AA/AMPS/tOAM//67/23/10 | 4410 | — | — | 88 |
| 41 | AA/AMPS/CHMAM//67/23/10 | 5760 | 93 | 86 | — |
| 42 | AA/AMPS/CHMAM//57/23/20 | 5160 | 51 | 86 | — |
| 43 | AA/AMPS/tBMAM//57/23/20 | 5470 | 82 | 89 | — |
| 44 | AA/AMPS/BeMAM//57/23/20 | 6250 | 48 | 93 | — |
| 45 | AA/AMPS/CA//67/23/10 | 4250 | — | 74 | — |
| 46 | AA/AMPS/CA//57/23/20 | 7610 | — | — | 94 |
| 47 | AA/AMPS/HEMA/EA//57/23/10/10 | 5540 | — | 46 | 99 |
| 48 | AA/AMPS/HEMA/tBAM//57/23/10/10 | 5340 | — | 91 | 95 |
| 49 | AA/AMPS/EA/tBAM//57/23/10/10 | 5370 | — | 91 | 100 |

[1]Test Condition 1: 2.5 ppm $Fe^{+3}$, 6 ppm $PO_4^{-3}$/250 ppm $Ca^{+2}$ as $CaCO_3$ 10 ppm active polymer, pH 8.5/70° C./17 hours.
[2]Test Condition 2: 15 ppm $PO_4^{-3}$, 1250 ppm $Ca^{+2}$ as $CaCO_3$ and 15 or 20 ppm active polymer, pH 8.5/70° C./24 hours.
AA = acrylic acid
AMPS = 2-acrylamido-2-methylpropane sulfonic acid
HEMA = hydroxyethyl methacrylate
HPA = hydroxypropyl acrylate
EA = ethyl acrylate
t-BAM = tertiary butyl acrylamide
AM = acrylamide
BeMAM = benzyl methacrylamide
CHMAM = cyclohexyl methacrylamide
tBA = tertiary butylacrylate
VAC = vinylacetate
DMAM = dimethylacrylamide
EAM = ethyl acrylamide
PrAM = propylacrylamide
tOAM = tertiary octyl acrylamide
CA = cellosolve acrylate
tBMAM = tertiary butyl methacrylamide Examples 1-10 are shown for comparative purposes. Examples 11-49 illustrate that the terpolymers and interpolymers containing the selected units and concentrations exhibit improved phosphate stabilization over copolymers of acrylic acid and AMPS, acrylic acid and the same vinyl esters, and copolymers of acrylic acid and the alkyl substituted acrylamide. For example, samples 2 and 3 illustrate the phosphate stabilization of conventional low molecular weight acrylic acid AMPS copolymers. Note that these copolymers exhibited poor phosphate stabilization (Test Condition 2) as compared with the selected terpolymers that also contain units of acrylic acid and AMPS, for example, sample 18. In addition, sample 4, a copolymer of acrylic acid and hydroxyethyl methacrylate, showed poor stabilization of the iron and phosphate containing water while sample 17 and 18 illustrates the marked improvement using a selected terpolymer. A conventional copolymer of acrylic acid and hydroxy propyl acrylate (Sample 5) also performed poorly as compared with samples 27-32 which utilized a selected acrylic acid/AMPS/HPA terpolymer. The acrylic acid/alkyl substituted acrylamide copolymer of sample 7 also showed poor phosphate and iron stabilization as compared with the selected terpolymers of the invention containing substituted acrylamides, for example, samples 38 and 39. Furthermore, even the comparative terpolymers formed from acrylic acid, AMPS and unsubstituted acrylamide showed poorer performance as compared with the acrylic acid/AMPS/ substituted acrylamide or vinyl ester terpolymers of the invention. Samples 16 and 17 illustrate the need for greater than 11 percent AMPS units in the selected terpolymer.

Samples 11-13 (ethyl acrylate), 15 (vinyl acetate), 14 (tertiary butyl acrylate), 16-26 (hydroxy ethyl methacrylate), 27-32 (hydroxy propyl acrylate) and 45 and 46 (cellosolve acrylate) show the advantage of the selected terpolymers incorporating at least 5 percent by weight vinyl ester units as compared to an acrylic acid/AMPS copolymer (Sample 3).

Furthermore, a comparison of Samples 33-44 with Samples 3 and 10 show the unexpected performance advantage of the terpolymers incorporating the substituted acrylamide over terpolymers formed from acrylic acid/AMPS and unsubstituted acrylamide.

Samples 11-13, 18-21, 28-30, 33-35, 38 and 39 show the effect of increasing the amount of the third unit while decreasing the amount of acrylic acid in the terpolymer. In most cases, phosphate stabilization is shown to be improved as the level of the third unit in the terpolymer is increased above 5 weight percent.

Samples 48 and 49 illustrate that further improvements over the terpolymers can be obtained if a selected interpolymer containing both a vinyl ester monomer and an alkyl substituted alkyl acrylamide at concentrations of at least 5 percent by weight are used. In comparison, Sample 47 illustrates that when two vinyl esters are used to form an interpolymer with acrylic acid and AMPS, no substantial improvement over a selected terpolymer containing the same level of either one of these vinyl esters occurs.

The selected terpolymers and interpolymers are also effective in stabilizing aqueous systems containing carbonate and sulfate salts. Table 2 illustrates calcium carbonate and calcium sulfate precipitation inhibition. The calcium sulfate data was obtained using a standard test method: NACE Standard TM-03-74 while the calcium carbonate data was obtained using the same procedure as described in U.S. Pat. No. 4,326,980 which method is hereby incorporated by reference herein.

TABLE 2

| | % Inhibition* | | | |
|---|---|---|---|---|
| | CaCO$_3$ | | CaSO$_4$ | |
| Sample No. | 1 ppm active polymer | 5 ppm active polymer | 0.2 ppm active polymer | 0.4 ppm active polymer |
| 3 | 37 | 75 | 36 | 98 |
| 5 | 19 | 47 | 17 | 74 |
| 20 | 11 | 29 | 14 | 52 |
| 30 | 14 | 28 | 21 | 74 |
| 13 | 14 | 29 | 26 | 76 |
| 46 | 18 | 21 | 19 | 66 |
| 10 | 15 | 33 | 26 | 90 |
| 36 | 18 | 30 | 21 | 64 |
| 35 | 20 | 20 | 19 | 90 |
| 39 | 23 | 39 | 24 | 57 |
| 48 | 14 | 31 | 22 | 64 |

*% Inhibition =

$$\frac{(ml\ EDTA\ of\ sample) - (ml\ EDTA\ of\ ``no\ polymer")}{(ml\ EDTA\ of\ ``100\%\ Inhibition") - (ml\ EDTA\ of\ ``no\ polymer")} \times 100\%$$

In addition to phosphate, carbonate and sulfate stabilization in aqueous systems, we have also found that the selected terpolymers and interpolymers are useful dispersants for suspended inorganic particulates in water. To demonstrate this we simulated an aqueous system containing suspended mud, silt or other hydrophillic particulates such as calcium carbonate using aqueous systems containing kaolin clay or iron oxide. The kaolin clay simulates inorganic particulates such as mud, silt or calcium carbonate. Iron oxide was selected because it is a commonly found hydrophobic particulate in recirculating cooling water. The iron oxide dispersion tests demonstrate the ability of the selected terpolymers to disperse hydrophobic particulates such as iron phosphate, the various forms of calcium phosphate, iron hydroxide and iron oxide.

The test procedures used for the kaolin dispersancy and iron oxide dispersion tests are as follows:

Kaolin dispersancy test

Into a multimix cup was placed 430 ml of water containing 200 ppm CaCl$_2$, as calcium carbonate, and 0.43 grams of hydrite UF Kaolin (1000 ppm kaolin). The mixture was mixed for 10 minutes and the pH of the mixture was then adjusted to pH 7.5 with sodium hydroxide. 100 ml aliquots of the adjusted mixture were placed in 4 ounce jars to which 5 ppm of the polymer (0.5 ml of a 0.1% solution adjusted to pH 8.0) was added. The jars were capped and allowed to stand undisturbed for 2 hours. The top 20 ml of each jar was then placed in a one ounce vial and the turbidity of the solution in the vial was measured, in nephelometric turbidity units (NTU), using an HF model DRT 100D turbidimeter. The results are shown in Table 3.

The iron oxide dispersancy tests were performed by placing into a multimix cup 430 ml of water containing 200 ppm CaCl$_2$, as calcium carbonate, and 0.30 grams of Fe$_2$O$_3$ (Fisher reagent)(700 ppm Fe 203). The mixture was mixed for 15 minutes and the pH was then adjusted to pH 7.5 using sodium hydroxide. 100 ml aliquots were then removed and placed in 4 ounce jars to which 3 ppm of polymer (0.3 ml of 0.1% polymer solution adjusted to pH 8.0) were added. The jars were capped and placed on a shaker for 15 minutes at low speed. Following the shaking the jars were allowed to stand undisturbed for 4 hours. The top 20 ml of each jar was then removed, placed in a one ounce vial and turbidity was measured using the HF model 100D turbidimeter in NTU's. The higher the NTU value the better the dispersion. The results are also shown in Table 3.

TABLE 3

| | NTUs | |
|---|---|---|
| Sample | Kaolin | Iron Oxide |
| Control 1 | 45 | 121 |
| Comparative 3 | 416 | 373 |
| 5 | 595 | 340 |
| 13 | 506 | 552 |
| 15 | 768 | 396 |
| 20 | 617 | 648 |
| 25 | 464 | 582 |
| 30 | 756 | 455 |
| 31 | 565 | 672 |
| 35 | 559 | 799 |
| 39 | 810 | 603 |

The selected terpolymers generally showed improved particulate dispersancy over conventional copolymer dispersants for both kaolin and iron oxide. The following table presents comparative data that demonstrates that the selected terpolymers of the invention yield improved performance as phosphate stabilizers and inorganic particulate dispersants in aqueous systems as compared with physical blends of known copolymers and homopolymers.

Comparative Sample 50 was prepared by blending 19% (active polymer solids) of an acrylic acid/AMPS copolymer (6.7/93.7 wt %) having an $\overline{Mw}$ (weight average) of 5070 with 81% (active) of a copolymer of acrylic acid and HEMA (80/20 wt. %, $\overline{Mw}$ 5460). 24.8 ppm of active polymer mixture was compared against 20 ppm of the terpolymers to insure that a fair comparison was made. A factor of 1.24 times the copolymer blend composition of 66 wt. % acrylic acid/18 wt. % AMPS and 16 wt. % HEMA resulted in an overall composition of 82 wt. % AA, 22 wt. % AMPS and 20 wt. % HEMA comparable to the terpolymer samples (20 and 25).

Comparative Sample 51 was prepared by blending 66% (active) of an AA/EA copolymer (70/30 wt. %) $\overline{Mw}$ 5340, 25 wt. % (active) of an AA/AMPS copolymer (6.3/93.7 wt. %) $\overline{Mw}$ 5070 and 9% (active) polyAA, $\overline{Mw}$ 4570.

Comparative Sample 52 was prepared by blending 60% (active) copolymer of AA/HPA (62/38 wt. %) $\overline{Mw}$ 3000, 25% (active) copolymer of AA/AMPS (6.3/96.7 wt. %) $\overline{Mw}$ 5070, and 15% (active) of polyAA $\overline{Mw}$ 4570.

Comparative Sample 53 was prepared by blending 66.7% (active) copolymer of AA/t-BAM (70/30 wt. %), $\overline{Mw}$ 2770, 24.5% (active) copolymer of AA/AMPS (6.3/93.7 wt. %) $\overline{Mw}$ 5070, and 8.8% polyAA, $\overline{Mw}$ 4570.

The results of the comparative tests, conducted according to the same general procedures described above, are presented in Table 4.

TABLE 4

Terpolymers vs. Blend
(Comparison at Equivalent Net Composition)

| Sample | Polyer Composition | $\overline{Mw}$ | % Calcium Phosphate Inhibition (Test Condition 2 at 20 ppm polymer) | Dispersancy Kaolin NTU's | Iron Oxide NTU's |
|---|---|---|---|---|---|
| 20 | AA/AMPS/HEMA (57/23/20) | 5430 | 96 | 617 | 648 |
| 25 | AA/AMPS/HEMA (57/23/20) | 8070 | 92 | 464 | 582 |
| 50 | Blend AA/AMPS/HEMA (66/18/16) | 5300 | 3 | 95 | 277 |
| 13 | AA/AMPS/EA (57/23/20) | 4840 | 95 | 879 | 742 |
| 51 | Blend AA/AMPS/EA (57/23/20) | 5060 | 11 | 540 | 503 |
| 30 | AA/AMPS/HPA (57/23/20) | 5610 | 91 | — | — |
| 31 | AA/AMPS/HPA (57/23/20) | 3970 | 94 | 565 | 672 |
| 52 | Blend AA/AMPS/HPA (54/23/23) | 4800 | 2 | 281 | 337 |
| 39 | AA/AMPS/t BAM (54/23/23) | 4610 | 95 | 810 | 602 |
| 53 | Blend AA/AMPS/t BAM (57/23/20) | 3560 | 14 | 627 | 487 |

Table 4 clearly demonstrates the unexpected superiority of the terpolymers for phosphate stabilization and for inorganic particulate dispersion as compared with blends of copolymers formulated to be substantially equivalent in their overall composition to the composition of the terpolymers.

In addition to dispersing particulates at low concentrations in aqueous systems, we also evaluated the ability of the selected terpolymers as dispersants for reducing the viscosity of concentrated suspensions or slurries of kaolin clay or calcium carbonate. The test procedure used for the kaolin clay slurries as follows:

Into a 1 liter stainless steel mixing cup was added 6.13 grams of a 10% solution of the selected polymer at pH about 7.0, 4.66 grams of 20% sodium carbonate solution, and enough water to bring the aqueous solution weight to 210 grams. To this was added 490 grams of ASP 600 kaolin clay and a slurry was formed by mixing the resultant mixture at low speed on a multimixer for about 5 minutes followed by 15 minutes at high speed. A 500 gram aliquot of the resultant 70 wt. % clay slurry with 0.125 wt. % (polymer on clay) dispersant was then removed and placed in a pint jar which was capped and shaken gently until the slurry cooled to room temperature. The viscosity of the slurry was then measured using a Brookfield RV viscometer and the pH of the slurry was also measured. To the slurry in the pint jar was added 0.88 grams of 10% polymer solution and 2.05 grams of kaolin clay (to raise the total dispersant level 0.025 wt. % and to keep the kaolin clay solids at 70%). The pint jar was then mixed on the multimixer at high speed for two minutes. The viscosity was measured and additional polymer and clay were then added, mixed and the measurements were repeated as described above. The results are shown in Table 5.

TABLE 5

Kaolin Clay Slurry Dispersancy: 20 rpm Brookfield Viscosity Versus Polymer Dosage

| Sample | 0.125% | 0.150% | 0.175% | 0.200% | 0.225% |
|---|---|---|---|---|---|
| 22 | 1316 | 438 | 408 | 450 | — |
| 31 | 2634 | 1054 | 696 | 614 | 786 |
| 39 | 2399 | 1748 | 792 | 677 | 746 |

The method used for determining the dispersancy of the terpolymers for concentrated calcium carbonate slurries was as follows:

Into a 1 liter stainless steel mixing cup was added 17.5 grams of a 10% polymer solution of pH about 7.0 and enough water to bring the weight of the aqueous solution to 300 grams. To this was added 700 grams of M60 precipitated calcium carbonate, from Mississippi Lime Company, and then mixed to form a slurry at low speed for about five minutes on the multimixer. The slurry was then mixed for 15 minutes at high speed. 500 grams of the resultant 70 wt. % CaCO3 slurry with 0.25 wt. % (polymer on CaCO3) dispersant was then poured into a pint jar, capped and shaken gently until the slurry cooled to room temperature. The viscosity of the slurry was then measured on a Brookfield RV Viscometer. To this slurry was added 1.76 grams of a 10% polymer solution and 4.10 grams of calcium carbonate to raise the total dispersant level 0.05 wt. % while maintaining the slurry solids at 70%. The slurry was then mixed for 2 minutes at high speed on the multimixer and the viscosity was measured. These steps were repeated as described above to demonstrate the reduction in viscosity as shown in Table 6.

TABLE 6

Calcium Carbonate Slurry Dispersancy
20 rpm Brookfield Viscosity at Various Polymer Dosages

| Sample | 0.25% | 0.30% | 0.35% | 0.40% | 0.45% | 0.50% | 0.55% |
|---|---|---|---|---|---|---|---|
| 13 | 31354 | 5900 | 2680 | 2060 | 1514 | 1484 | 1654 |
| 29 | 31294 | 3708 | 1766 | 1212 | 1086 | 1052 | 1154 |

Tables 5 and 6 demonstrate the effectiveness of the terpolymers and interpolymers as dispersants for aqueous kaolin clay and calcium carbonate slurries. As the polymer concentration increases, the viscosity of the slurry decreases until a minimum viscosity is reached. As the polymer concentration is increased above the concentration needed to achieve the minimum viscosity, the viscosity begins to increase. The viscosity of the slurries when no dispersant was added was too high to measure at 20 RPM.

The hydrolytic stability of polymers used in water treatment applications is important. Many water treatment formulations, particularly those containing polyphosphates, must be kept at high pH (pH greater than 11) to prevent reversion of the polyphosphate to orthophosphate. A polymer that is not stable to high pH must be packaged separately from the polyphosphate. Table 7 compares the hydrolytic stability of several of the terpolymers of the invention. This test involved the preparation of a 10% (active) polymer solution in deionized water followed by adjusting the pH of the solution to pH 13.5. The adjusted sample was then placed in a 70° C. oven for the intervals indicated in Table 7. The polymers were then tested for their ability to inhibit phosphate precipitation in high phosphate water (as in Test Condition 2) at 20 ppm polymer concentration. A significant reduction in the percent precipitation inhibition indicates that the polymer is not hydrolytically stable.

TABLE 7

Calcium Phosphate Precipitation Inhibition as a Function of Hydrolytic Stability during Storage at High pH

| Sample | Initial | 3 days | 2 weeks | 1 month |
|--------|---------|--------|---------|---------|
| 13 | 97 | 36 | — | 36 |
| 20 | 97 | 66 | 71 | 68 |
| 31 | 94 | 45 | — | 40 |
| 35 | 98 | 97 | 96 | 86 |
| 39 | 90 | 97 | 96 | 84 |

This Table evidences that the AA/AMPS/vinyl ester terpolymers (Samples 13, 20 and 31), while possessing a high initial inhibition performance, are not stable to hydrolysis and would have to be packaged separately from a high pH formulation. Samples 35 and 39 which are terpolymers of AA/AMPS/alkyl substituted acrylamides are hydrolytically stable, maintaining their high initial phosphate precipitation inhibition, and can be formulated at high pH in a single package.

In order for a polymer to function properly in water treatment applications, the polymer must be soluble in the water to which it is added. It is well known that, for a given composition, as the molecular weight of a polymer is decreased the solubility of the polymer in water increases. Therefore, in order to make a valid comparison of the effect of the composition of the terpolymers on solubility, polymers should be compared at about the same molecular weight. Table 8 shows a comparison of the solubility of selected terpolymers, with copolymers and homopolymers of similar molecular weights. Each of the aqueous solutions contained 100 ppm (active) polymer and 6000 ppm $CaCl_2$ as calcium carbonate. The Samples were placed in 4 ounce jars which were then placed in a water bath at 61° C. The samples were then brought to equilibrium temperature and the percent transmittance as measured by a Brinkman PC/600 colorimeter using a 520 nanometer filter, were recorded. Higher polymer solubility is evidenced by higher percent transmittance.

TABLE 8

Polymer Solubility

| Sample | | $\overline{Mw}$ | Solubility % Transmittance |
|--------|--|-----|---------|
| 54 | Polyacrylic acid | 4500 | 56 |
| 6 | AA/EA (80/20) | 5300 | 82 |
| 3 | AA/AMPS (77/23) | 4500 | 90 |
| 30 | AA/AMPS/HPA (57/23/20) | 5610 | 100 |

TABLE 8-continued

Polymer Solubility

| Sample | | $\overline{Mw}$ | Solubility % Transmittance |
|--------|--|-----|---------|
| 39 | AA/AMPS/t-BAM (57/23/20) | 4610 | 98 |

Table 8 demonstrates that at about the same $\overline{Mw}$, the terpolymers of AA/AMPS and either a vinyl ester monomer or alkyl substituted acrylamide (samples 30 and 39) of the invention are more soluble than copolyers of AA/AMPS or copolymers of AA and a vinyl ester (samples 3 and 6). It is expected that the solubility of an AA/substituted acrylamide copolymer would be similar to the solubility of the AA/EA copolymer, namely, less soluble than the AA/AMPS/substituted acrylamide terpolymer of the invention.

Further it has been found that polymers formed from about 60 to about 90 weight percent (meth)acrylic acid and salts thereof and from about 40 to about 10 weight percent substituted acrylamides, having a weight average molecular weight of from about 2500 to about 8000, are unexpectedly useful as precipitation inhibitors for zinc and its salts in aqueous systems, as exemplified by Sample 7 in Table 9.

TABLE 9

Zinc Hydroxide Stability Test (High Alkalinity)

| | Soluble Zinc, ppm | |
|--------|------|------|
| Sample | pH 8 | pH 9 |
| 3 | 3.8 | 1.4 |
| 5 | 3.9 | 1.1 |
| 7 | 3.7 | 2.6 |
| 13 | 3.8 | 2.1 |
| 30 | 3.9 | 1.9 |
| 20 | 3.9 | 1.5 |
| 10 | 3.8 | 0.8 |
| 35 | 4.0 | 1.9 |
| 37 | 3.9 | 1.7 |
| 48 | 3.9 | 2.9 |
| 1 | 0.6 | 0.3 |

Conditions: 5 ppm Zinc/250 ppm $CaCl_2$ as $CaCO_3$/150 ppm $MgCl_2$ as $CaCO_3$/300 ppm $NaHCO_3$ as $CaCO_3$/20 ppm active polymer/104 F(40 C)/24 hours.

What is claimed is:

1. A method for stablilizing an aqueous system by inhibiting the precipitation of calcium phosphate with and without the presence of iron contamination in such an aqueous system comprising adding to said aqueous system an effective amount of a water soluble polymer comprising from about 42 to about 84 weight percent (meth)acrylic acid and salts thereof, greater than about 11 to less than about 40 weight percent 2-acrylamido -2methyl propane sulfonic acid or salts thereof, and from at least about 5 to about 30 weight percent of one or more units selected from the group consisting of vinyl esters, vinyl acetate and substituted acrylamide, and where said water soluble polymer a weight average molecular weight ranging from about 3000 to about 25,000.

2. The method of claim 1 where said water soluble polymer comprises from about 10 to about 84 weight percent (meth)acrylic acid and salts thereof, greater than about 11 to less than about 40 weight percent 2-acrylamido-2-methyl propane sulfonic acid, and from at least about 5 to about 50 weight percent of one or more units selected from the group consisting of vinyl esters, vinyl acetate and substituted acrylamide.

3. The method of claims 1 or 2 where said vinyl esters are characterized by the formula:

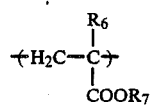

where
R$_6$ is hydrogen or CH$_3$; and
R$_7$ is a C$_1$-C$_6$ alkyl group, a C$_6$-C$_{10}$ aryl group, a C$_6$-C$_{10}$ aralkyl group or

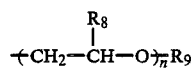

where
R$_8$ is hydrogen or CH$_3$;
R$_9$ is a C$_1$-C$_6$ alkyl group or hydrogen; and
n is an integer of from 1 to 3.

4. The method of claims 1 or 2 where said substituted acrylamides are characterized by the formula:

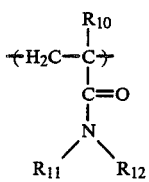

where
R$_{10}$ is hydrogen or CH$_3$; and
R$_{11}$ and R$_{12}$ are either hydrogen, a C$_1$-C$_8$ alkyl, a C$_6$-C$_8$ cycloalkyl, a benzyl group, or

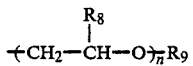

where
R$_8$ is hydrogen or CH$_3$;
R$_9$ is a C$_1$-C$_6$ alkyl group or hydrogen;
n is an integer of from 1 to 3; and
such that R$_{11}$ and R$_{12}$ are not both hydrogen.

5. The method of claim 1 where said water soluble polymer is a terpolymer having a weight average molecular weight of from about 4000 to about 8000.

6. The method of claim 5 where said terpolymer comprises from about 10 to about 84 weight percent (meth)acrylic acid and salts thereof, greater than about 11 and less than 40 weight percent 2-acrylamido-2-methyl propane sulfonic acid and from about 5 to about 50 weight percent of a substituted acrylamide having the formula:

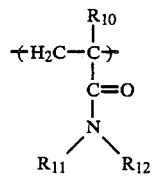

where
R$_{10}$ is hydrogen or CH$_3$; and
R$_{11}$ and R$_{12}$ are either hydrogen, a C$_1$-C$_8$ alkyl, a C$_6$-C$_8$ cycloalkyl, a benzyl group, or

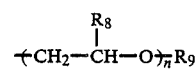

where
R$_8$ is hydrogen or CH$_3$;
R$_9$ is a C$_1$-C$_6$ alkyl group or hydrogen;
n is an integer of from 1 to 3; and
such that R$_{11}$ and R$_{12}$ are not both hydrogen.

7. The method of claim 1 where said water soluble polymer is a terpolymer comprising 57 weight percent (meth)acrylic acid or salt, 23 percent by weight 2-acrylamido-2-methyl propane sulfonic acid and 20 weight percent of a third unit selected from the group consisting of vinyl esters, vinyl acetate and substituted acrylamide and having a weight average molecular weight of from about 4500 to about 5500.

8. The method of claim 1 for stabilizing aqueous systems where the water soluble polymer comprises from about 10 to 84 weight percent acrylic acid, from greater than about 11 toless than 40 weight percent 2-acrylamido-2-methyl propane sulfonic acid and from at least about 5 to about 50 percent of a substitued acrylamide, said polymer being stable to hydrolysis under elevated pH conditions.

9. The method of claim 1 where said aqueous system is a boiler and where the concentration of said polymer added to said aqueous boiler water ranges from about 0.1 to about 500 parts per million.

* * * * *